(12) United States Patent
Gütte (10) Patent No.: US 9,723,846 B2
(45) Date of Patent: Aug. 8, 2017

(54) MEASURING DEVICE FOR INDIVIDUALLY DETECTING BODY FEATURES OF SLAUGHTERED ANIMAL BODIES THAT CAN BE CONVEYED IN A ROW AND PROCESSING DEVICE COMPRISING AT LEAST ONE SUCH MEASURING DEVICE

(71) Applicant: NORDISCHER MASCHINENBAU RUD. BAADER GMBH + CO. KG, Lübeck (DE)

(72) Inventor: Ulrich Gütte, Bad Oldesloe (DE)

(73) Assignee: Nordischer Maschinenbau Rud. Baader GmbH+Co. KG, Lubeck (DE)

( * ) Notice: Subject to any disclaimer, the term of this patent is extended or adjusted under 35 U.S.C. 154(b) by 220 days.

(21) Appl. No.: 14/362,179

(22) PCT Filed: Nov. 23, 2012

(86) PCT No.: PCT/EP2012/073450
§ 371 (c)(1),
(2) Date: Jun. 2, 2014

(87) PCT Pub. No.: WO2013/079401
PCT Pub. Date: Jun. 6, 2013

(65) Prior Publication Data
US 2014/0318285 A1  Oct. 30, 2014

(30) Foreign Application Priority Data

Dec. 2, 2011  (EP) .................................. 11191797

(51) Int. Cl.
*A22B 5/00* (2006.01)
(52) U.S. Cl.
CPC ................ *A22B 5/00* (2013.01); *A22B 5/007* (2013.01)

(58) Field of Classification Search
CPC ........... A22B 3/005; A22B 5/00; A22C 25/16; A22C 21/0023
(Continued)

(56) References Cited

U.S. PATENT DOCUMENTS

| 4,882,810 A | * | 11/1989 | Ostholt | A22C 21/0076 452/136 |
| 5,045,024 A | * | 9/1991 | Diesing | A22C 21/0046 269/48.1 |

(Continued)

FOREIGN PATENT DOCUMENTS

DE  39 15 513 A1  11/1990

OTHER PUBLICATIONS

International Search Report; International File Date: Nov. 23, 2012; Nordischer Maschinenbau Rud. Baader GMBH + Co. KG; 2 pgs.

*Primary Examiner* — Natalie Huls
*Assistant Examiner* — Monica S Young
(74) *Attorney, Agent, or Firm* — Sunstone IP (57) ABSTRACT

The invention relates to an animal body measuring apparatus, designed to individually detect features of slaughtered animal bodies that are conveyable in a row at a distance from each other and along a path, in particular poultry bodies, which measuring apparatus comprises at least one sensor, a measurement passage space for conveying the animal bodies through along a measurement passage path, on which at least one said sensor is arranged, and a holding means. The holding means comprises a movement means, by means of which said sensor, by moving the sensor back and forth, is displaceable between the measurement position lying within the measurement passage space and an outer position permitting free passage of the animal bodies, which outer position as such lies completely outside the measurement passage space. A processing apparatus for removing the meat of slaughtered animal bodies, in particular gutted (Continued)

bodies of poultry whose extremities have been detached, comprises at least one measuring apparatus of the stated design.

15 Claims, 4 Drawing Sheets

(58) Field of Classification Search
    USPC .......................................................... 73/865.8
    See application file for complete search history.

(56) References Cited

U.S. PATENT DOCUMENTS

| | | | | |
|---|---|---|---|---|
| 5,492,502 | A * | 2/1996 | Hjorth | A22C 25/142 |
| | | | | 452/149 |
| 6,007,416 | A * | 12/1999 | Janssen | A22C 21/003 |
| | | | | 452/135 |
| 6,200,211 | B1 * | 3/2001 | Braeger | A22C 25/16 |
| | | | | 452/161 |
| 6,277,019 | B1 * | 8/2001 | Veldkamp | G01N 21/8507 |
| | | | | 452/127 |
| 6,649,412 | B1 | 11/2003 | Borggaard et al. | |
| 6,935,942 | B1 * | 8/2005 | Evers | A22C 21/003 |
| | | | | 452/150 |
| 7,128,642 | B1 * | 10/2006 | Veldkamp | A22C 17/12 |
| | | | | 452/129 |
| 8,753,177 | B2 * | 6/2014 | Schroder | A22C 17/12 |
| | | | | 452/134 |
| 2003/0008608 | A1 * | 1/2003 | Scalia | A22B 5/0035 |
| | | | | 452/157 |
| 2012/0315834 | A1 * | 12/2012 | Van Der Steen | A22B 5/007 |
| | | | | 452/125 |

\* cited by examiner

MEASURING DEVICE FOR INDIVIDUALLY DETECTING BODY FEATURES OF SLAUGHTERED ANIMAL BODIES THAT CAN BE CONVEYED IN A ROW AND PROCESSING DEVICE COMPRISING AT LEAST ONE SUCH MEASURING DEVICE

CROSS-REFERENCE TO RELATED APPLICATIONS

This application claims priority to PCT/EP2012/073450, having a filing date of Nov. 23, 2012 which claims priority to European Patent Application 11191797.7 having a filing date of Dec. 2, 2011, the entire contents of each of which are hereby incorporated by reference.

FIELD OF TECHNOLOGY

The following relates to an animal body measuring apparatus designed to individually detect features of slaughtered animal bodies that are conveyable in a row at a distance from each other and along a path, in particular poultry bodies to be filleted, said measuring apparatus comprising at least one sensor designed to measure at least one feature of the animal body, a measurement passage space for conveying the animal bodies through the measurement passage path, on which at least one said sensor is arranged for measurement during conveyance, and a holding means, which holds said sensor in a position lying within the measurement passage space. The invention also refers to a processing apparatus which is equipped with at least one said measuring apparatus.

BACKGROUND

Said measuring apparatus is usually part of a processing apparatus for processing slaughtered animal bodies, with animal bodies understood to include animal body parts as well. The processing apparatus is particularly designed for processing poultry, particularly filleting breast caps or front halves. The apparatus, particularly for removing the meat from gutted bodies of slaughtered poultry without extremities, comprises processing tools arranged in a processing line, a driven conveyor with holding apparatuses arranged on it in a row along the processing line to transport animal bodies that are supported there, particularly saddled poultry bodies and, to let these pass the processing tools, at least one measuring apparatus emitting measurement signals for recording individual body features of the animal bodies, and a control device, which receives the measurement signals, for controlling the operation of the processing tools.

A generic processing apparatus with measuring apparatuses is known, for example, from DE 198 48 498 A1 and described there. The holding apparatuses are arranged along the processing line on the conveyor, which is usually rotatingly equipped with an upper and lower run. In most cases, the holding apparatus is provided as a saddle-like support body, as known and described, for example, in DE 39 18 345 A1. The measuring apparatus constitutes a measurement station in the processing apparatus. The sensor records specific data which concern individual features of the animal body to be processed. For example, size, geometry and/or position in space are determined. The body joints of a poultry body, specifically the two articulation points of the shoulder, are particularly suited as measurement points which are oriented toward the front in the conveyor's direction of transport and are detected by dedicated sensors, which are formed by measuring elements which are deflectable, particularly when subject to restoring force, such as measuring tags. In particular, a measuring apparatus is also envisaged which measures the thickness, i.e. a cross dimension of the animal body to be processed, and works with measuring elements under restoring force, for example in the form of a pair of flap-like pivot elements.

The known measuring apparatuses, which are equipped with the pivoting sensors, can only record poultry bodies conveyed in a row which are sufficiently spaced during transport and/or the conveyance. The throughput is limited due to minimum distances to be maintained. The pivot-mounted sensors disengage from the holding apparatus and/or the animal body supported thereon only after its passage through the measuring apparatus, and they require time and space between the holding apparatuses to assume a defined initial position, specifically a standard position, for the start of the following measurement.

SUMMARY

Thus, the invention is based on the objects to create a measuring apparatus which is operable significantly faster for individual measurement of animal bodies conveyed in a row. The measurement operation is also to be improved where necessary with respect to protection of the sensor and/or the sensor improved for measurement.

The objects are achieved in conjunction with the features of the measuring apparatus mentioned hereinbefore by the holding apparatuses comprising a movement means with which said sensor is adjustable by movement back and forth between the measurement position lying within the measurement passage space and an outer position permitting free passage of the animal bodies, the outer position as such lying completely outside the measurement passage space. In the outer position, a cross-sectional overlap of the sensor cannot occur with the animal body to be measured in the measurement passage space. A processing apparatus mentioned hereinbefore has at least one said measuring apparatus according to the invention. This particularly increases throughput, and measures and possibilities for increasing throughput are improved.

The invention selectively effects the measurement position on the one hand and the outer position of the sensor on the other. In the measurement position, the sensor is located within the measurement passage and/or the associated passage path, namely in a passage cross-section which is passed by animal bodies to measure. In the measurement position, measurement of the animal body takes place in such a way that using the sensor at a particular position or even in a particular area of the animal body a particular position, dimension or even a measurement recording a representative condition is attained. The sensor can be constituted by any suitable measuring apparatus which works with tactile contact or with non-tactile contact, particularly which is optical or otherwise effected with measurement shafts and/or beams. According to the invention, the sensor is located in its outer position, which is raised compared with the measurement position triggered, completely outside the measurement passage space. Thus in the raised/outer position, it comes to lie with the animal body to measure, completely free of cross-sectional overlap, i.e. outside the cross-section in which the animal body to be measured passes the passage space. The outer position enables the sensor to be set in a position, in particular in an initial or normal position, without influence from the animal body passing through the measurement passage, said position defining or preparing the start of measurement for the next measurement. This start of measurement can consequently be planned and set nearly independently, i.e. without limitation from the time interval of conveyance of animal bodies to measure one after the other. Moreover, one possibly achieves improved use of calculation time for a control/evaluation unit processing the measurement result. Is also achieved that the sensor is not constantly in one correspondence position corresponding to the measurement position while the animal body passes, but is instead held in the outer position at least for the most part at time without measurement. These measures also result in protection of the animal body to be measured during passage through the measurement passage of the measuring apparatus. In a processing apparatus according to the invention in which at least one measuring apparatus according to the invention is situated, the throughput can be increased considerably, largely independent of the processes for measurement.

According to the invention, the holding means of the sensor comprises a movement means which moves the sensor back and forth in such a way that it alternately assumes the measurement position or the outer position. Many designs are possible for such a movement means. The displacement of movement means can advantageously be achieved by a pivot mechanism in which the sensor is pivotable back and forth on a pivot axis extending particularly in the direction of the measurement passage path. Advantageously, the sensor can be pivotably hinged via a lever-like or arm-like element, for example like a piston or crank-like element, which is operated with a controlled drive, advantageously a pneumatic one.

It has been proven to be particularly advantageous to connect a sensor able to pivot on a pivot axis to move out and a holding element stationary in the apparatus with a control element, the length of which can be changed by control, to effect the pivoting movement of the sensor for moving out or moving in according to the measure of the change in length. The length-adjustable control element is advantageously a controllable pneumatic cylinder. A preferred embodiment is constituted where the length-adjustable control element and the stationary holding element are pivot-mounted on a shared axis, specifically on a measurement pivot axis, to perform a measuring pivot movement for measurement on the animal body.

The movement means can also comprise a cam for controlling the displacement of the sensor between a measurement position and an outer position. The cam can be a sliding block guide for a control path, for example. The drive can be implemented by active elements, such as by a pneumatic system or passive means, particularly by levers or rod guides, which are preferably connected to drive, conveyance and/or control elements of a processing apparatus and thus are operable and/or controllable with these.

An optical sensor can be provided, for example, which works without contact, and which, in its measurement position, records a measurement value at an assigned point and is designed to record the quantity to measure without contact with the animal body.

A particularly advantageous design is constituted where the movement means comprises a control means which effects a time sequence, said control means being designed such that it controls movement of the sensor first in its measurement position and after completion of the measurement in its outer position still during the passage of the measured animal body. The control means can comprise a computer-controlled and/or mechanical control.

A normal position which defines the start of each measurement advantageously belongs to the outer position. Depending on the time required, such an initial position can be established particularly in the time directly after performing the measurement and in any case at the time when the animal body to be measured has not yet completely passed the sensor in the measurement passage, in particular only to a small extent as well. This is particularly important for designs in which the sensor is arranged and configured on the measurement passage path so that it touches the animal body to be measured and is to be moved out of this position again.

Preferably at least one said sensor is designed in an in principle known manner such that it is pivotable in its measurement position, particularly against restoring force, coming to rest on each animal body to be measured, wherein it produces a measurement result in proportion to the measurement pivot deflection from a normal position and in the outer position achieves the normal position by action of a restoring force. In such a case, the outer position comprises a defined normal position between two sequential measurements. However, a normal position defining the start of measurement can also be set in other cases in the sensor's outer position, i.e. generally in cases in which the sensor with its position set in the outer position, maintaining it in this respect, is brought to the measurement position to perform the measurement by starting in the latter position.

A sensor which, particularly against restoring force, comes to rest by pivoting in its measurement position on each animal body to measure is advantageous as a measurement tag, known in itself, or designed as another rigid pivot element which, upon contacting a point of the poultry body to measure, deflects by rotation to generate a measurement.

Advantageously, a measuring apparatus is designed and arranged with a deflectable sensor for recording the position of at least one pre-aligned body point of conveyed animal bodies in the processing line of a processing apparatus. In this case and generally in processing apparatus according to the invention the measurement signal acquired during the conveyance is available to a control device of the processing apparatus to control the operation of processing tools, particularly separation tools. In particular, sensors, formed by measuring tags or the like, are usually arranged in pairs to identify and/or record the shoulder body joints of poultry bodies to be measured and/or processed. Such sensors are installed offset, corresponding to the interval of the body joints.

A measuring apparatus according to the invention is also configurable to record a lateral dimension, in particular the maximum thickness of each animal body. Such a measuring apparatus comprises in an in principle known manner, for example, two sensors or measuring elements arranged in a plane and forming, in the manner of a two-leaf swinging door, a measurement passage or a passage capable of opening, particularly against restoring force, for body measurement. Such a measuring apparatus also supplies control signals for the control device of the processing apparatus to control one or more processing/separation apparatuses or other parts or units along the processing line.

A particular advantage of a processing apparatus according to the invention is that the movement means of the measuring apparatus can comprise a means of control or setting by which the time in which the sensor is in its outer position is set according to the requirement of a desired time interval between two sequential holding apparatuses during conveyance. The sequence and/or speed of the change of the sensor's displacement between its measurement position and its outer position can be set depending on the desired time interval between two sequential holding apparatuses. This setting is not impaired or hindered by the conveying distance of the holding apparatuses, which are the same in most cases and also equally spaced, i.e. in particular not by time required for measurement, for example by running a computer control program of the measuring apparatus and/or a control device of the processing apparatus for measurement processing and/or evaluation.

A particular advantage of the processing apparatus according to the invention is that the throughput can still be increased even with relatively low conveying speed or conveying speed limited by design and/or operating parameters of the processing apparatus. Thus the control means of the measuring apparatus can be configured and set such that the short time for measurement between two sequential holding apparatuses can be matched. At constant conveying speed, these can be arranged with the same spatial distance and thus in a correspondingly reduced time interval by reducing the spatial distance, with the time between two initial/normal positions able to be selected according to the invention on the scale of the timed spacing of the holding apparatuses or less. The (equal) interval of the holding apparatuses can be reduced to a generally small size which determines and thus significantly increases the throughput of the processing apparatus and/or the system operated with it.

Dependent claims are based on the embodiments of the invention described and on other practical and advantageous embodiments. Only particularly practical and advantageous forms and options are further detailed based on the following description of the exemplary embodiments shown in the schematic drawing. Each individual or detailed design described in an exemplary embodiment is to be understood as an independent detail example for other implementations or designs in the scope of the invention which are not described or are described only in part.

BRIEF DESCRIPTION

The drawings show in

DETAILED DESCRIPTION

Figure 1:
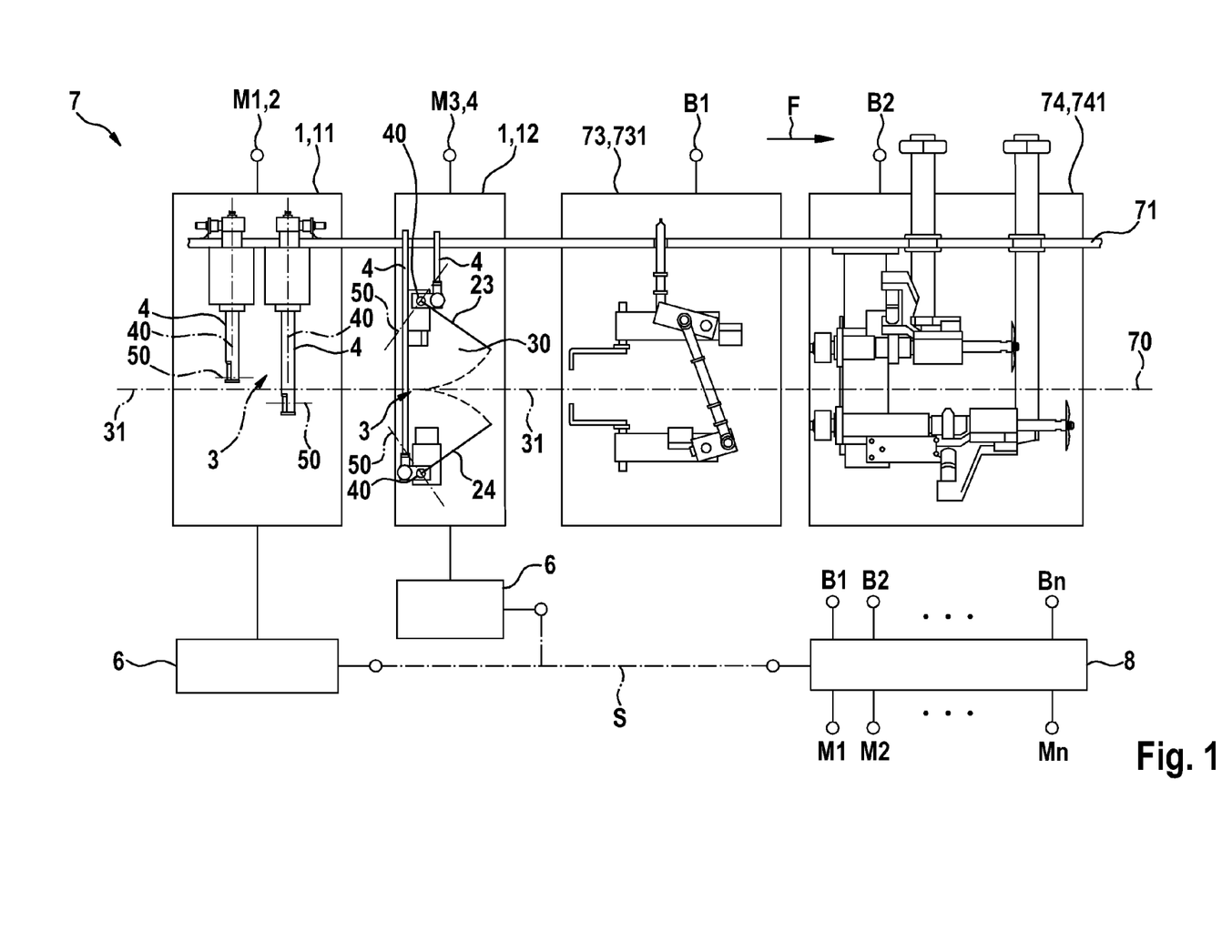
FIG. 1 a top view of a section of the lower run of a processing apparatus according to the invention equipped with a measuring apparatus according to the invention, FIGS. 2A and 2B a side view and top view of parts of a measuring apparatus according to the invention which is arranged on a conveyor section conveying animal bodies by means of holding apparatuses, FIGS. 3A and 3B a frontal view and side view of the measuring apparatus of FIG. 2 in a raised condition, and FIGS. 4A and 4B a frontal view and side view of the measuring apparatus of FIG. 2 in a moved-in condition.

FIG. 1 shows a section of a known processing apparatus 7. The example is a poultry handling and processing apparatus for separating the fillets of gutted bodies of poultry whose extremities have been detached. Such a processing apparatus comprises a plurality of stations which are arranged along a conveyor section which has an upper and lower run and belongs to a processing line 70. Parts, specifically and in particular processing tools of the stations, are operated using a computerised control device 8, which produces the control signals B1, . . . , Bn supplied to the stations in particular according to the requirements of measurement/control signals M1 . . . Mn.

FIG. 1 shows only two processing stations 73, 74 arranged on the lower run, namely a first scraping apparatus 731 and a second scraping apparatus 741, which is arranged after the first one in the direction of conveyance F, with associated processing tools.

The lower run section shown is also equipped with two measuring apparatuses 1; 11, 12 which are arranged upstream of the processing stations 73, 74 in the processing line 70. As will be described in more detail, the measuring apparatuses 1 are designed according to the invention. In the processing apparatus 7 according to the invention according to the exemplary embodiment of FIG. 1, the measuring apparatus 11 is assigned to the processing station 73, while the measuring apparatus 12 is assigned to the processing station 74. The measuring apparatus 12 is arranged between the measuring apparatus 11 and the processing station 73.

The processing apparatus 7 comprises a frame or housing 71 on which the processing tools of the individual stations are arranged and attached. A conveyor device which is not shown has a continuously rotating conveyor which constitutes the upper and lower run. Known holding apparatuses 77 are attached on the conveyor at equal distances. Parts of the holding apparatus 77 are seen in FIG. 2B to 4B. It comprises a support body 772 forming a saddle and a base plate bearing the support body, attached to the conveyor, and a clamping device which is not shown. The holding apparatus 77 is located on the lower run in position with the support body 772 pointing downward.

Parts of the poultry body 90 are the sternum plate 91, the sternum 92, the coracoids 93 and the wishbone 94. Body joints 96, on which shoulder blades 95 are also seated, connect the wishbone 94 with the coracoids 93.

The poultry body 90 rests on the holding apparatus 77, with the sternum plate 91 coming to lie on the saddle support surface of the support body 772, and is secured by means of the clamping device, which comprises a clamping lever working against the sternum plate 91 and/or the support surface of the support body 772. A suitable clamping/control mechanism, which is not shown and which comprises a trigger element 774 projecting on the base plate 771, opens and closes the clamping device for loading and unloading. Associated constructions and mechanisms, which can be quite varied, are common and known.

The measuring apparatus 11 is described in more detail below based on FIG. 2A to 4B.

The measuring apparatus 11 is designed to detect body joints 96 of a passing animal body 9, specifically a poultry body 90. The measurement takes place in particular to record the positions of the body joints 96 for each individual poultry body 90. Information on the body dimensions can also be obtained.

As can be seen in FIG. 2A to 4B, according to the exemplary embodiment, the measuring apparatus 11 comprises two sensors 2, specifically a first pivot element 21 for measurement and a second pivot element 22 for measurement. A part of the measuring apparatus 11 forming the holding means 4 bears the two pivot elements 21, 22 for measurement. The holding means 4 comprises a plurality of parts, specifically a console or a bearing body 41, holding elements 42 supported thereon, specifically holding arms 421, a bearing element 43 attached on an associated holding element 421 in each case, specifically a bearing plate 431 and, between the pivot element 21, 22 for measurement and the bearing element 43 in each case, a movement means 5. The bearing body 41 can be a console or holding base, for example, which is constituted in particular by a frame, a housing and a bearing part 410 of the measuring apparatus 11. For example, a part of a housing wall of the processing apparatus 7 can form the bearing body 41, as seen in FIG. 1.

As shown in FIG. 3A to 4B with dash-dotted lines, the measuring apparatus 11 comprises a passage space 3 and a passage path 31. The passage path 31 is the path which the measurement object, specifically the animal body 9 or the poultry body 90, must travel to pass the at least one sensor 2 or the pivot elements 21, 22 for measurement which are arranged on the passage path 31. Accordingly, the passage space 3 is the space in which the at least one sensor 2 and/or the pivot elements 21, 22 for measurement is enclosed spatially and physically for measurement and which is envisaged and designed for crossing the animal body 9 and/or the poultry body 90.

Figure 4A:
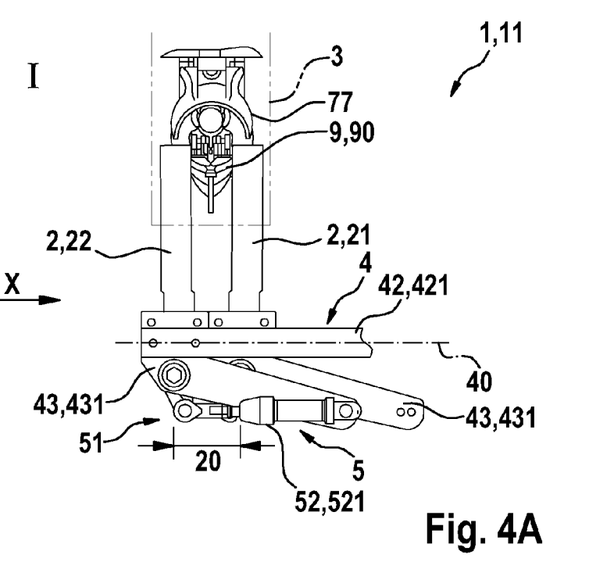
Figure 4B:
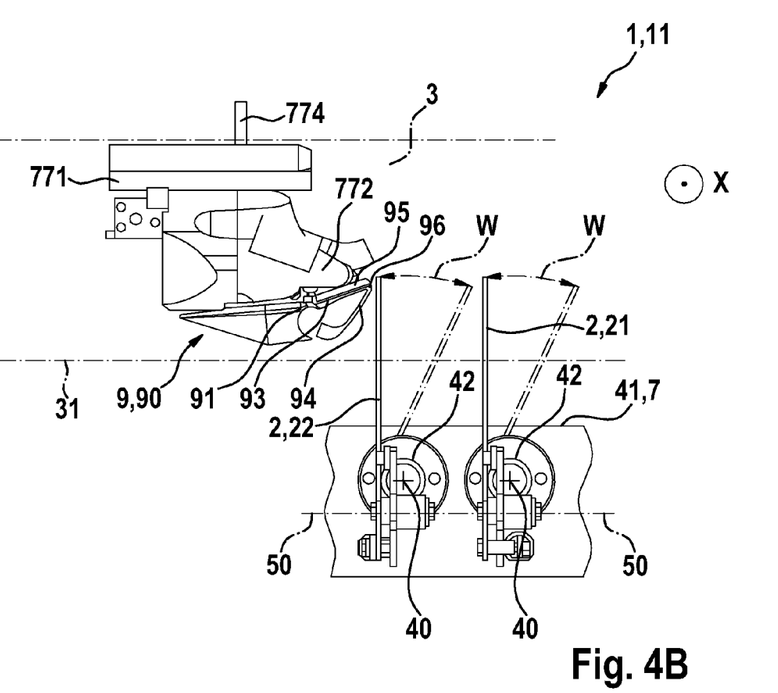

In the exemplary embodiment, the pivot elements 21, 22 for measurement are arranged at a distance 20 transverse to the measurement passage path 31, which corresponds to the spacing of the body joints 96 of the poultry body 90. The transverse distance 20 is configured so that the body joints 96 of all poultry bodies 90 to be measured are recorded by touching for measurement. As is generally known, for this purpose the pivot elements 21, 22 for measurement are constituted by rigid measuring tags which have a sufficient width transverse to the measurement passage path 31 so that they protrude into the path of each body joint 96 for measurement. This arrangement is shown in FIGS. 4A and 4B. Each pivot element 21, 22 for measurement is attached and rotationally fixed on the associated holding element 42, which is supported on the bearing body 41 and can pivot on a pivot axis 40 for measurement. Each pivot element 21, 22 for measurement is dimensioned with length such that its free end is in the path of the body joints 96. The pivot elements 21, 22 for measurement are arranged offset in the moving direction of conveyance F of the measurement object or along the measurement path 31. They can also lie next to each other at the same path position.

The measurement arrangement and function of the pivot elements 21, 22 for measurement are known per se. In FIG. 4B, the right body joint 96 is directly before measurement contact with the pivot element 21 for measurement, which pivots by a measurement angle W of approximately 25°, for example, to measure the body joint 96, doing so by turning adjustment of the holding element 42 on the measurement pivot axis 40. This measurement angle W, which can also be significantly less than 25°, is recorded with a measurement means 32 and converted to a corresponding measurement signal M1. To produce a measurement signal M2 in the same way, the other body joint 96 on the left is measured with the second pivot element 22 for measurement, which is located at a distance after the first pivot element 21 for measurement along the passage path 31. The resulting combined measurement signal can also be constituted from M1 and M2.

The positions of the pivot elements 21, 22 for measurement shown in FIGS. 1, 2A, 2B, 4A and 4B belong to measurement positions I of the pivot elements 21, 22 for measurement. The measurement position I is generally defined as a position in which the sensor 2 spatially overlaps with parts of the animal body 9 to be measured in the measurement passage space 3 and/or in the measurement passage path 31 before its measuring contact and during its measuring contact with the animal body point to measure.

Figure 3A:
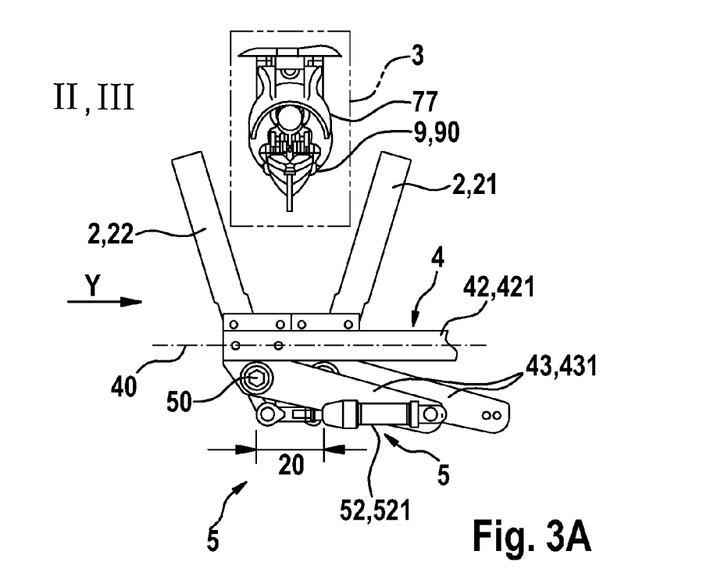
Figure 3B:
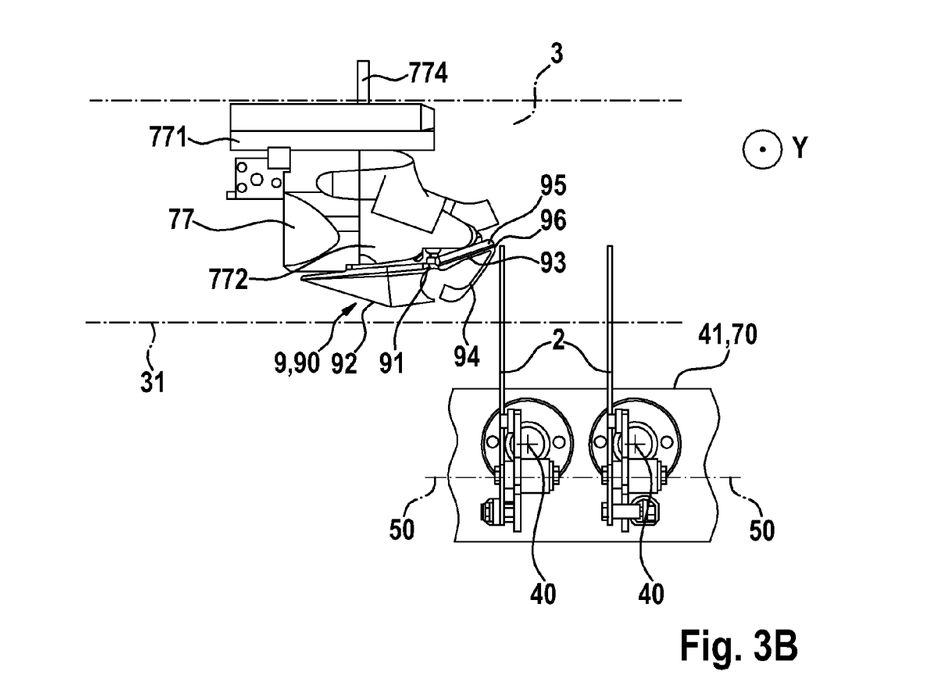

In FIGS. 3A and 3B, the measuring apparatus 1 is shown with positions of the pivot elements 21, 22 for measurement which ensure free passage of the poultry bodies 90. The positions shown for the pivot elements 21, 22 for measurement are outer positions II. The sensor 2 is located completely outside the measurement passage space 3 in each outer position.

In the exemplary embodiment, the movement means 5 in each case with an associated bearing element 43 and connected to the pivot elements 21 or 22 for measurement is a length-adjustable control element 52, namely a pneumatic cylinder 521, which constitutes part of a pivot mechanism 51 and controls the pivot element 21, 22 for measurement with pivoting movement on a pivot axis 50 for moving out. The pivot axis 50 extends in the direction of the measurement passage 31. As is particularly clear when comparing FIG. 3A, 3B and FIG. 4A, 4B, the movement means 5 enables back-and-forth motion of the associated pivot element 21 or 22 for measurement between the measurement position I and the outer position II.

The frequency and/or the sequence of the back-and-forth motion of the at least one sensor 2 or in the exemplary embodiment of the pivot elements 21, 22 for measurement can be configured in many ways as required. Thus the movement means 5 can be provided with a motion drive, in the example with a controlled pneumatic drive, which controls the motion in time intervals which can be defined or set in a fixed manner. It is particularly practical and advantageous to control or arrange the movement between measurement position I and the outer position II as required or depending on the passage speed of the animal body 9 through the measurement passage space 3 and/or depending on the spatial interval with which the animal bodies 9 to measure follow one another.

In the exemplary embodiment of FIG. 1, the measuring apparatus 11 comprises a control means 6, which in each case controls movement of the pivot elements 21, 22 for measurement in measurement position I and after completion of the measurement in the outer position (II) during the passage of the measured poultry body (90). Such a control can be implemented with any conventional pneumatic control, for example as shown in FIG. 2B with the reference number 522 and associated lines 523. Instead of a pneumatic control, any other suitable motion control can be used for the drive and movement sequence. In particular a cam control, which is not shown, can be connected with elements of the conveyor of the processing apparatus 7 to effect movement drive.

The control means 6 can also be constituted by a control part of the control device 8, as shown in FIG. 1 with control connection S.

In the exemplary embodiment according to FIG. 1, it is particularly advantageous that the measurements can be performed on poultry bodies 90 which follow one another with even very small spacing. This succeeds by the pivot elements 21, 22 for measurement being able to execute a sudden controlled movement out of the measurement passage space into the V-shaped position shown in FIG. 3A in each case after conclusion of the measuring procedure, for example after a measurement and possible subsequent deflection of about 25°. Moving up to the outer position II achieves an initial or normal position III for measurement at the same time. This position is defined by at least one sensor 2 and/or the pivot elements 21, 22 for measurement not only reaching the outer position in which the measurement passage is cleared for the animal body 9 measured or to be measured but also a defined position for starting the next measurement. This position is assumed in FIG. 3A and FIG. 4B. In this respect it is independent of the pivot position of the pivot elements 21, 22 for measurement about the pivot axes 50 to move out as long as the pivot elements 21, 22 for measurement do not touch or are not in active measuring contact with the animal body 9. In the exemplary embodiment, it is important that the measurement deflection on the pivot axis 40 for measurement is restored in each case. Restoring the pivot deflection can be done by a restoring device 33 producing a restoring force, for example, which produces a restoring force during deflection or at a point of deflection, which returns the pivot element 21, 22 for measurement to the normal or zero position.

Figure 2A:
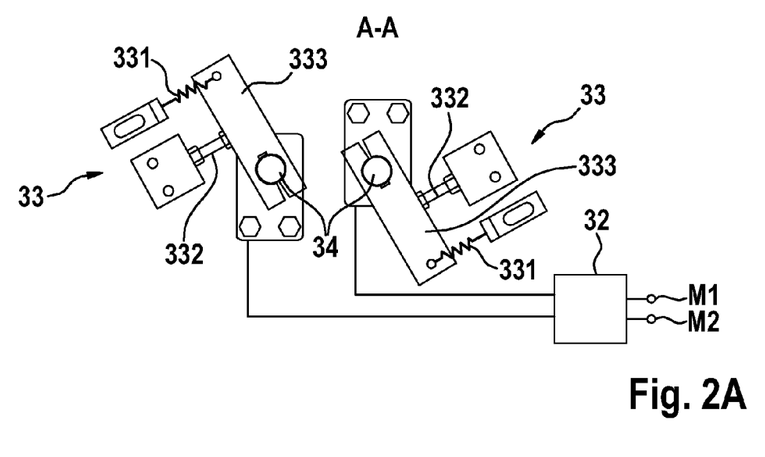
Figure 2B:
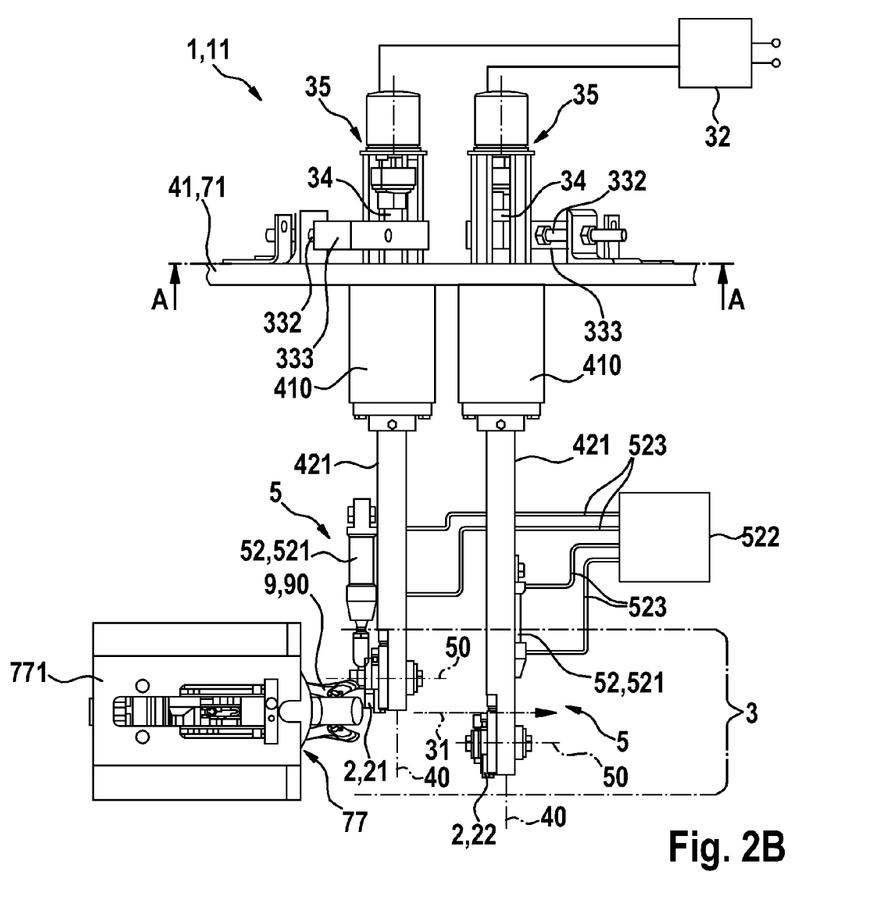

An example of an arrangement with a restoring device 33 is shown in FIGS. 2A and 2B. In each case, the holding element is connected in a rotationally fixed manner with an axial element 34, which in turn is connected in a rotationally fixed manner with an arm element 333. A tension spring 331 holds the arm element 333 in the outer and normal position II, III against a stationary, fixed stop 332. For example, the measurement deflection W can be converted to a signal supplied to the measurement means 32 via the axial element 34 using a converter such as an angle encoder.

The relatively small space described between two sequential animal bodies 9 is achieved in the exemplary embodiment of the processing apparatus 7 by the holding apparatuses 77 on the conveyor being arranged with corresponding small, equal spacing. This achieves a significant increase of the throughput. With particularly constant conveying speed, the timing of the control means 6 can then be set or configured as required by the chosen small space between the holding apparatuses 77.

The first measuring apparatus 11, which detects the body joints 96, controls the scraping tools of the scraping device 731 using the control device 8, for example to space it as required by the individual distances of the body joints 96.

As shown in FIG. 1, the second measuring apparatus 12 comprises two sensors 2, specifically pivot elements 23, 24 for measurement, which are constituted in symmetrical arrangement by flaps of a door-like measurement passage. Pivot axes 40 for measurement are oriented at least essentially perpendicular to a measurement passage plane 30, which corresponds to a plane of conveyance which lies parallel to the base plates 771 of the support body 772. For measurement, i.e. during the passage of the animal body 9, the flaps are swung up on the pivot axes 40 for measurement to record in particular a maximum lateral dimension of each animal body 9. To bring the flaps into their initial or normal position for measurement after performing such a thickness measurement, doing so selectively and particularly before the complete passage of the animal body 9, a holding means 4, which supports the pair of flaps for pivoting movement, comprises a movement means not shown in FIG. 1, specifically a pivot mechanism with which the flaps can be pivoted completely out of the measurement passage space and/or conveyance passage space in each case by pivoting on a pivot axis 50 to move out, specifically to an outer position as previously defined in conjunction with the description of the measuring apparatus 11. It can be seen that the sensors 2 of the measuring apparatus 12 are pivoted up or down as well with respect to the passage plane 30 and/or the plane of conveyance, while in contrast the pivot elements 21, 22 for measurement of the measuring apparatus 11 are arranged to swivel to the side of the measurement passage path 31. The pivot axes 50 to move out of the measuring apparatus 12 are arranged parallel to the measurement passage plane 30 and perpendicular to the flap surfaces, for example. The measurement apparatus 12 is equipped with a control means 6 the same as measurement apparatus 11.

The invention claimed is:

1. An animal body measuring apparatus designed to individually detect features of slaughtered animal bodies that are conveyable in a row at a distance from each other and along a path, said measuring apparatus comprising at least one sensor designed to measure at least one feature of the animal body, a measurement passage space for conveying the animal bodies through along the measurement passage path, on which at least one said sensor is arranged for measurement during conveyance, and a holding means, which holds said sensor in a position lying within the measurement passage space, wherein the holding means comprises a movement means, by which said sensor, by moving the sensor back and forth, is displaceable between a measurement position lying within the measurement passage space and an outer position permitting free passage of the animal bodies, the outer position as such lying completely outside the measurement passage space, wherein at least one said sensor is designed such that it is pivotable in the measurement position, coming to rest on the animal body to be measured, wherein the sensor produces a measurement value according to the measurement pivot deflection from the normal position, and wherein after the measurement pivot deflection the sensor returns to the normal position by way of the outer position, wherein the outer position comprises a defined normal position of the sensor between two sequential measurements.

2. The measuring apparatus according to claim 1, wherein said movement means comprises a pivot mechanism for controlling the displacement of said sensor by pivoting back and forth between the measurement position and the outer position.

3. The measuring apparatus according to claim 2, wherein the sensor can pivot on a pivot axis of the pivot mechanism which extends in the direction of the passage path.

4. The measuring apparatus according to claim 2, wherein the pivot mechanism comprises a length-adjustable control element, the length of which is adjustable by control, by which the sensor and a bearing element stationary in the apparatus are connected.

5. The measuring apparatus according to claim 4, wherein the length-adjustable control element is a pneumatic cylinder.

6. The measuring apparatus according to claim 4, wherein the bearing element stationary in the apparatus is arranged on the free end of a holding element stationary in the apparatus.

7. The measuring apparatus according to claim 6, wherein the holding element for performing a measurement of the animal body can pivot on a measurement pivot axis oriented transversely to the measurement passage path.

8. The measuring apparatus according to claim 1, wherein the movement means comprises a device that provides a directional guide for controlling the displacement of said sensor between the measurement position and the outer position.

9. The measuring apparatus according to claim 1, wherein said sensor is arranged on the passage path such that in the measurement position it touches the animal body to be measured.

10. The measuring apparatus according to claim 1, wherein the movement means comprises a control means which effects a time sequence, said control means being designed such that it controls the sensor first in its measurement position and after completion of the measurement in its outer position still during the passage of the measured animal body.

11. A processing apparatus for removing the meat from slaughtered animal bodies, in particular from gutted bodies of poultry without extremities, comprising processing stations arranged in a processing line, a driven conveyor with holding apparatuses arranged in a row along the processing line to transport animal bodies supported there and to let these pass the processing stations, at least one measuring apparatus emitting measurement signals for recording individual body features of the animal bodies during their conveyance, and a control device, which receives the measurement signals, for controlling the processing stations, wherein said measuring apparatus is constituted by a measuring apparatus according to claim 1.

12. The processing apparatus according to claim 11, wherein said measuring apparatus is arranged for recording the position of at least one pre-aligned body point of the conveyed animal bodies in the processing line, wherein the sensor comprises at least one pivot element for measurement which is adapted to rest in its measurement position on the body point, said element pivoting up for measurement in its measurement position and pivoting back in the outer position to its normal position.

13. The processing apparatus according to claim 11, wherein said measuring apparatus comprises at least one said sensor, which is constituted by a pivot element for measurement which is adapted to rest in its measurement position on the animal body, said pivot element being able to be pivoted back and forth between the measurement position and the outer position on a pivot axis extending transversely to the direction of the passage path.

14. The processing apparatus according to claim 11, wherein the movement means of said measuring apparatus comprises a control means with which the time in which the sensor is in its outer position is set according to a desired time interval between two sequential holding apparatuses during conveyance.

15. The processing apparatus according to claim 14, wherein sequential holding apparatuses are arranged with the same spatial distance with which at constant conveying speed of the holding apparatuses the time interval is specified in which said sensor is in its outer position.

* * * * *